Oct. 31, 1961 C. F. SCHAEFER 3,006,542
SYNCHRONIZER FOR TRACKING COMPUTERS
Filed Nov. 15, 1950 2 Sheets-Sheet 1

INVENTOR.
CARL F. SCHAEFER
BY
ATTORNEY

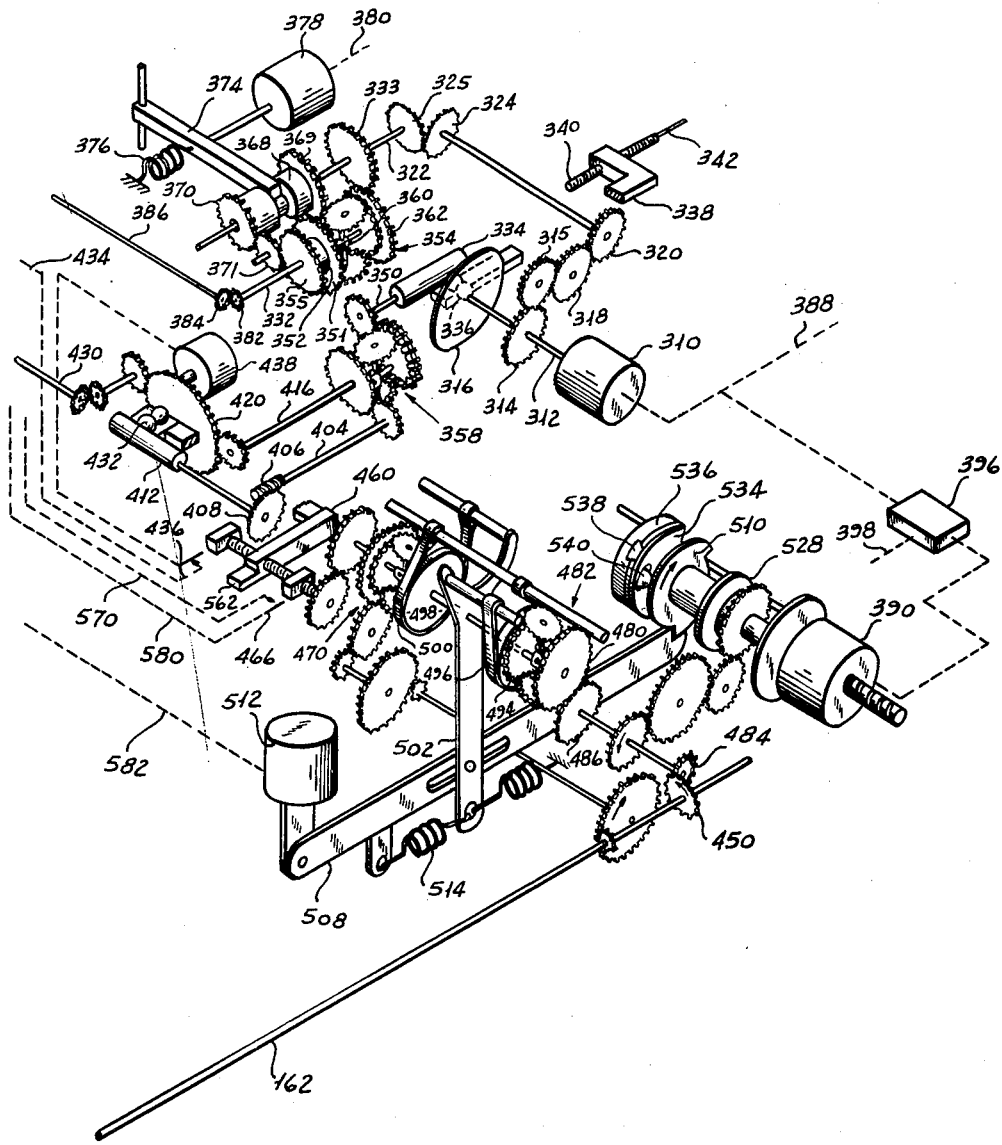

United States Patent Office 3,006,542
Patented Oct. 31, 1961

3,006,542
SYNCHRONIZER FOR TRACKING COMPUTERS
Carl F. Schaefer, Port Washington, N.Y., assignor, by mesne assignments, to United Aircraft Corporation, East Hartford, Conn., a corporation of Delaware
Filed Nov. 15, 1950, Ser. No. 195,779
20 Claims. (Cl. 235—61.5)

My invention relates to synchronizers for tracking computers, and more particularly to an improved synchronizing assembly whereby errors computed by a tracking computer for fire control in rates of change of range or rates of change of deflection or bearing are easily, rapidly and efficiently determined and corrected.

Tracking computers are well known to the art in connection with various fire control installations either for naval gunfire or for bombsights. These computers are adapted to receive as inputs the course and speed of the firing vessel or aircraft, the direction and velocity of the wind, the course and speed of the target, the bearing of the target from the firing vessel or the target angle, that is, the angle between the course of the firing vessel and the direction of the target from the firing vessel. In the case of computers for bombsights, the altitude of the aircraft and the attitude thereof, that is, the angle of climb or glide from horizontal flight, may also be used as inputs. The computer, whatever its construction, has as an output a rate of change of range or a rate of change of deflection or azimuth, or both. Computers are usually used in conjunction with sighting systems which may be either optical or radar in their nature. It is to be understood that my invention is applicable to tracking computers of any nature.

For purposes of simplicity my synchronizer will be described as applied to an optical sighting system, as, for example, that shown in application Serial No. 141,798 of Maurits ten Bosch et al., filed February 1, 1950. In the optical sighting system there shown, the horizontal cross hair represents a function of range as computed by the computer. As the range changes the horizontal cross wire should change as a function of the actual range change. Similarly, the azimuth of an output by the computer is represented by the vertical cross bar. As the bearing, deflection or azimuth changes, the vertical cross wire should stay on the target, representing a computed change in azimuth matching the actual change in azimuth. If the computer is generating an erroneous rate of change of range due to variations in wind velocity or direction or both, or due to an unexpected maneuver of a moving target, or due to errors of air speed, altitude or course of the bombing plane, or other causes, it is desirable rapidly and accurately to correct the rate of change of range output of the computer to conform with the actual rate of change of range existing. I propose to do this by feeding an increment of change of range to the computer which will serve to correct the difference between the computed rate of change of range and the actual rate of change of range. Frequently the computer may be generating a correct rate, but the position between the horizontal cross wire and the point of aim may be displaced. It is desirable to be able to correct the range resulting in a displacement of the horizontal cross wire under these conditions without affecting the velocity of range change generated by the computer. Similarly, when there is a displacement of the vertical cross wire from the point of aim this indicates that the actual azimuth is different from the computed azimuth. By means of my tracking computer I am enabled to shift the vertical cross wire to the target in a simple, rapid and expeditious manner. If the velocity of azimuth change generated by the computer differs from the actual velocity of azimuth change determined by the numerous variables entering into the problem, this will be indicated by a drift of the vertical cross wire to the right or to the left of the point of aim. My synchronizer assembly enables me to quickly, expeditiously and simply introduce a correction in the velocity of azimuth change so that the computer will generate a correct velocity of azimuth change. When the computer is synchronized for the velocity of change of range and the velocity of change of azimuth or deflection, both the horizontal and vertical cross wires of the sighting system will remain at all times on the target.

One object of my invention is to provide a synchronizer for tracking computers in which the horizontal cross wire may be moved rapidly to the target to correct for differences between the actual range and the range generated by a computer.

Another object of my invention is to provide a synchronizer for tracking computers in which the rate of change of range or the velocity of range change generated by a computer may be quickly, accurately and simply corrected to bring the computed velocity of range change into agreement with the actual velocity of range change.

Another object of my invention is to provide a synchronizer for tracking computers in which the vertical cross wire or other indication representing azimuth or target angle or deflection may be quickly shifted to the target by making a correction in azimuth.

Another object of my invention is to provide a synchronizer for tracking computers in which the computed velocity of azimuth, deflection or target angle change, that is, the rate of change of azimuth, may be brought into agreement with the actual velocity of azimuth change in a simple, convenient and expeditious manner.

Another object of my invention is to provide a synchronizer for tracking computers which is sure and simple in operation and simple in construction.

Another object of my invention is to provide a range and azimuth correction system for tracking computers in which displacement-only corrections may be made at a rapid rate if desired.

A further object of my invention is to provide a range and azimuth correction system for tracking computers in which the rate correction is generated and made automatically by displacing the sighting system from a point of error to the point of aim in a simple manner.

Other and further objects of my invention will appear from the following description.

In the accompanying drawings which form part of the instant specification and which are to be read in conjunction therewith:

FIGURE 2 is a diagrammatic view similar to FIGURE 1, showing the azimuth correction system of my synchronizer assembly.

Figure 1:
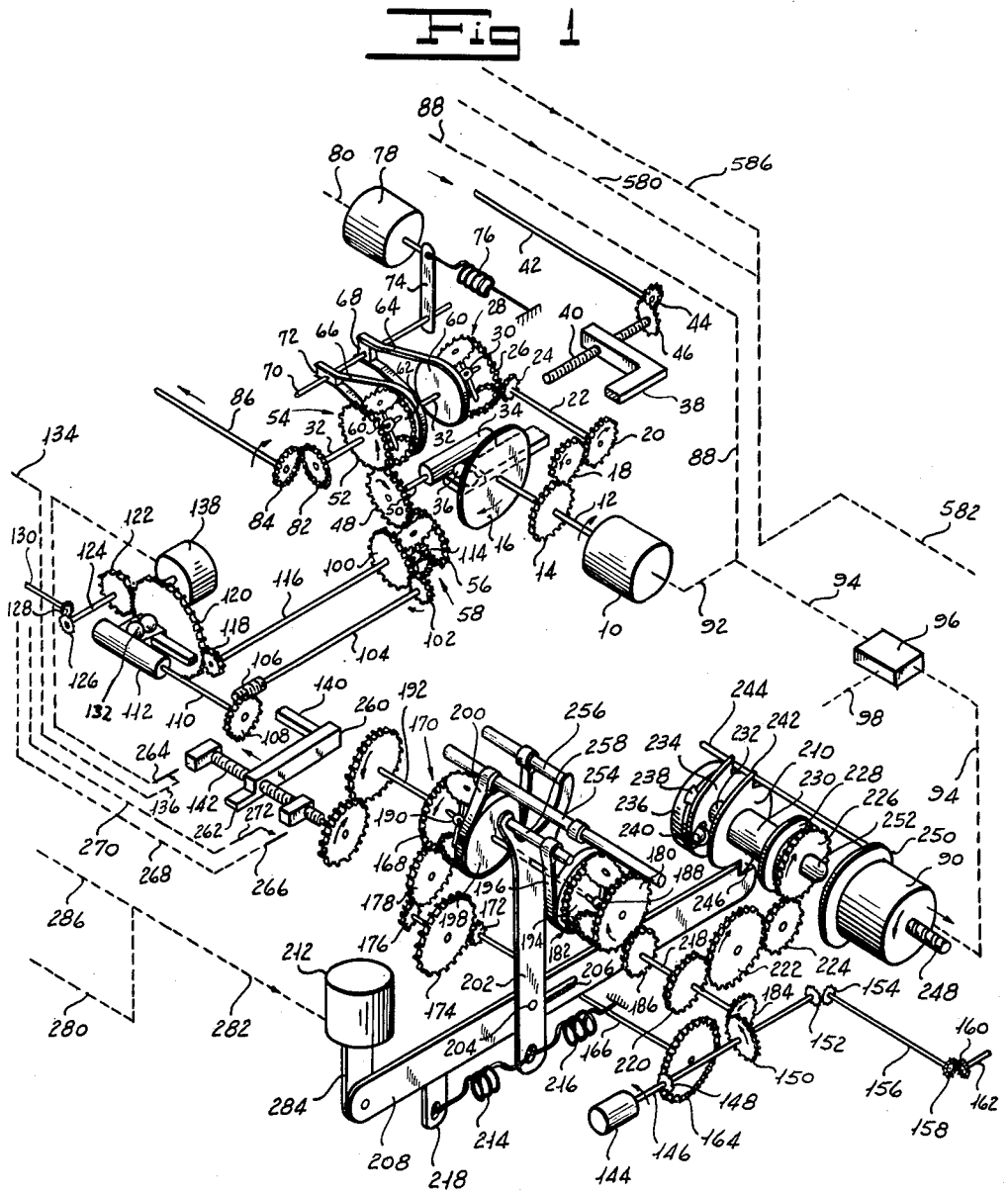
FIGURE 1 is a diagrammatic view showing the construction of the range correction system forming part of my synchronizer assembly.

Referring now to FIGURE 1 in which the range system is shown, I provide a correction motor 10 which is a reversible type, constant speed motor adapted to be driven at a speed of $$\frac{\omega_R}{R}$$

revolutions, where $\omega_R$ is the rate of correction applied to the range input of the computer and where R is range.

The motor shaft 12 drives a gear 14 and a disk 16 secured thereto for rotation therewith. The gear 14 drives an idler gear 18 and a gear 20 which is secured to a shaft 22 for rotation therewith. The shaft 22 drives a bevel pinion 24 which meshes with and drives one side gear 26 of a differential indicated generally by the reference numeral 28. This differential, as will be pointed out more fully hereinafter, is the "fast" differential. The cross 30 of the differential 28 is secured to a shaft 32 for rotation therewith. The disk 16 drives a roller 34 through displaceable balls 36. The balls 36 are adapted to be displaced from the center of the disk 16 in direct proportion to the ground range between the limits of my assembly. The balls 36 are carried in a displaceable member 38, the position of which is governed by a screw 40. An input shaft 42 is adapted to be rotated as a function of range and is adapted to drive a bevel gear 44 which meshes with a bevel gear 46 carried by the screw 40. Since the disk and ball arrangement is a mechanical multiplier in which the speed of the disk $$\frac{\omega_R}{R}$$

is multiplied by the position of the balls (R), the output of the multiplier represented by the speed of rotation of the gear 48 carried by the shaft 50 secured to the roller 34 is proportional to $\omega_R$. Since the optical sighting system presentation is a function of ground range, the linear rate of displacement between the horizontal cross wire and the point of aim will be substantially the same for different values of range. The gear 48 drives the side gear 52 of a second differential indicated generally by the reference numeral 54, and the side gear 56 of a third differential indicated generally by the reference numeral 58. The cross 60' of the differential 54 is secured to the same shaft 32 as the cross 30 of the differential 28. The differential 54 is the "slow" differential as will be pointed out more fully hereinafter. The side gear 60 of the differential 28 is adapted to be controlled by a band brake 64. The side gear 62 of the differential 54 is adapted to be controlled by a band brake 66. The band brake 64 is controlled by a member 68 secured to a shaft 70 for rotation therewith. The band brake 66 is adapted to be controlled by a member 72 secured to the same shaft 70. The arrangement is such that when the band brake 66 is set, the band brake 64 is released, and when the band brake 64 is set, the band brake 66 is released. The control members 68 and 72 for the band brakes are in such phase position that this result is accomplished. An actuating lever 74 is secured to the shaft 70 for rotation therewith. A spring 76 normally urges the shaft to rotate in a clockwise direction, as viewed from the right. A solenoid 78 adapted to be energized through channel 80 is adapted to rotate shaft 70 in a counterclockwise direction against the action of spring 76. When the solenoid is de-energized the parts will assume the position shown in FIGURE 1, that is, with the band brake 66 set by the spring 76 and the band brake 64 released. In this position the side gear 62 of the slow differential 54 is immobilized and the side gear 60 of the fast differential is free. Accordingly, the output of the correction motor through the gears 14, 18 and 20 and shaft 22 to the fast differential will contribute nothing to the output of shaft 32. Let us assume that the correction motor is driving shaft 12 in the direction of the arrow. The remaining arrows show the instantaneous directions of motion of the other parts due to the influence of the correction motor drive. The side gear 26 will rotate idly in one direction and the side gear 60, being free, will rotate idly in the opposite direction. The side gear 62, however, is locked so that the side gear 52 will carry the cross 60' of the differential 54 around in the same direction that side gear 52 is rotating in. The cross 30, being secured to shaft 32, will also be carried around, idling side gear 60 which is released and free to rotate. The shaft 32 carries a gear 82 which meshes with a gear 84 which is secured to an output shaft 86. The output of this shaft, as we have seen, represents $\omega_R$, and this is fed to the tracking computer whenever a correction of range is made by the energization of the correction motor 10. A signal channel 88 is adapted to energize both the correction motor 10 and a recycle solenoid 90. This channel is energized from the tracking switch which may be any suitable form of a double-throw switch. The operating member of the switch may be a lever arranged such that when it is thrown away from the operator the correction motor will be driven in one direction, and when it is pulled toward the operator the correction motor will run in the other direction, the energization taking place from channel 88 through channel 92. A branch channel 94 is adapted to energize the recycle solenoid 90 from channel 88. This channel has interposed therein a switch 96 controlled through channel 98 which is adapted to operate switch 96 whenever the range exceeds a predetermined limit of the capacity of the computer.

The side gear 100 of the differential 58 drives a pinion 102 connected to a shaft 104, to which is secured a worm 106 engaging a worm gear 108 secured to a shaft 110 driving a roller 112. The cross 114 of the differential 58 is adapted to drive a shaft 116 which carries a pinion 118 adapted to drive a disk 120 of a disk and roller inverse multiplier. The disk 120 is adapted to drive a gear 122 secured to a shaft 124 which carries a bevel gear 126 meshing with a bevel gear 128 secured to a shaft 130. Normally, the disk 120 does not engage the balls 132. When the balls are not loaded, since the disk drive is connected to the output shaft 130 while the roller is free, the $\omega_R$ drive transmitted through the differential 58 will rotate shaft 104 to idle the roller 112 without driving the range rate output shaft 130 through the disk 120. The balls 132 of the inverse multiplier arrangement are displaced from the center of the disk 120 of this inverse multiplier proportional to the time which has elapsed between the last displacement correction, provided the rate switch has not been actuated or the stabilization limits exceeded, as will be pointed out more fully hereinafter. The rate switch energizes channel 134 which is adapted to energize a solenoid 138 through a limit switch 136. When the solenoid 138 is energized, the balls 132, which are interposed between the disk 120 and the roller 112, will be loaded so that the disk will be driven to drive the range rate output shaft 130. The inverse multiplier is driven at a rate of $\omega_R$. The balls 132 are carried by a member 140 which is controlled by a screw 142 which is driven as a function of time from the timing system, as will be pointed out more fully hereinafter. Accordingly, the output of the disk will be equal to $$\frac{\omega_R}{t}$$

in which $t$ represents time. A disk and ball arrangement will provide a very low torque and be subject to slippages. The booster shaft 104 serves automatically to maintain a nonslipping condition by means of the differential and the unidirectional worm 106 which drives the roller. This arrangement is described more fully in my copending application for a reciprocal integrator, Serial No. 139,293, filed January 18, 1950, now Patent No. 2,584,230. Whenever the rate switch is operated to energize the solenoid 138, the correction motor 10 will generate an appropriate rate correction which is fed through shaft 130 to the computer.

Coming now to the timing system in FIGURE 1, a constant speed motor 144 drives a shaft 146 which carries a bevel pinion 148, a bevel gear 150 and a bevel pinion 152. The bevel pinion 152 meshes with a bevel pinion 154 which drives a shaft 156 to which is secured a bevel pinion 158 which drives a bevel pinion 160 secured to a shaft 162 which extends to FIGURE 2 to furnish the timing power for the azimuth correction system, as will be described more fully hereinafter. The bevel pinion 148 drives a gear 164 secured to a shaft 166 which drives the side gear 168 of the differential indicated generally by the reference numeral 170 through a reducing gear train comprising pinion 172, gear 174, pinion 176 and gear 178. The gear 150 drives a side gear 180 of a differential indicated generally by the reference numeral 182 through a gear train comprising gears 184 and 186. It will be observed that the side gear 180 of the differential 182 is driven at a much more rapid rate than the side gear 168 of the differential 170. The cross 188 of the differential 182 and the cross 190 of the differential 170 are both secured to a shaft 192. The side gear 194 of the differential 182 is provided with a band brake 196 which, when set, is adapted to immobilize the side gear 194. Similarly, the side gear 198 of the differential 170 is provided with a band brake 200 adapted to immobilize the side gear 198. A lever 202 is pivoted about the axis of shaft 192 and is provided with a pivot pin 204 positioned in the slot 206 formed in the member 208 which is mounted for axial movement under the control of the recycle cam 210 and is adapted to be pivoted about pin 204 by means of the recycle disabling solenoid 212, as will be pointed out more fully hereinafter. The lower end of the lever 202 carries a pair of springs 214 and 216. One end of each of the springs is secured to the lower end of the lever 202. One end of spring 214 is secured to bracket 218 carried by the member 208. The other end of spring 216 is secured to a stationary part. The gear 184 driven from the timing motor is secured to a shaft 218 which carries for rotation therewith a gear 220 which meshes with an idler gear 222 to drive a gear 224 to rotate the gear 226 in the direction of the arrow shown in FIGURE 1. The gear 226 is secured to and forms part of one member of a recycle clutch, the other plate of which 228 carries the recycle cam 210 through sleeve 230 supported by a shaft 232. The shaft 232 carries a five-second cam 234 and a plate 236 secured thereto. The plate 236 is formed with a notch or re-entrant portion 238. The five-second cam carries a ball 240 seated in an appropriate opening formed in the cam 234. The upper toe 242 of the recycle cam engages a rod 244 carried by the recycle solenoid 90. The lower toe 246 of the recycle cam engages a notch formed at the end of the member 208. The rotary recycle solenoid 90 is mounted on a stationary, spirally toothed core 248. When the recycle solenoid is energized it will move rearwardly and rotate in a counterclockwise direction. The rearward movement of the solenoid will disengage its face 250 from the contact member 252 carried by the rotating clutch member 226 and thus disengage the driving clutch plate 226 from the coacting clutch plate 228. With the clutch disengaged, the recycle cam 210 is no longer being driven in a clockwise direction so that the rod 244 engaging the toe 242 will rotate the recycle cam in a counterclockwise direction and at the same time will rotate the five-second cam 234 in a counterclockwise direction through its toe. This will carry the ball 240 out of the notch 238 and the parts will be in the position shown in FIGURE 1. The spring 214 will become slack due to the fact that the member 208 is no longer restrained by the lower toe 246 of the recycle cam, in carrying the member 208 to the right, as viewed in FIGURE 1. The lever 202 will then be permitted to rotate in a counterclockwise direction under the influence of spring 216. One end of the band brake 200 and one end of the band brake 196 are secured to a fixed rod 254. The lever 202 is provided with an arm 256 to which the other end of band brake 200 is secured, and an arm 258 to which the other end of band brake 196 is secured. The rotation of the lever 202 in a counterclockwise direction will tighten band brake 200 and loosen band brake 196. When band brake 200 is tightened the cross 190 of the differential 170 will rotate the shaft 192 in the direction of the side gear 168. Due to the fact that the side gear 194 of the differential 182 is at this time loose, the rotation of side gear 180 will merely idle the side gear 194 and have no driving influence upon the cross 188 of the differential 182. Accordingly, when the recycle solenoid is energized, as shown in FIGURE 1, the shaft 192 will be driven at the slow rate and will move the arm 260 of the member 140 in the direction of the arrow at the slow rate in a direction to displace the balls 132 from the center of the disk 120 of the reciprocal integrator in the direction of increasing time. The arm 260 is provided with a lug 262 which is adapted to contact the arm 264 of the limit switch 136 to interrupt the channel energizing the rate solenoid 138. Any desired length may be used for the screw 142. In practice, the full travel of the arm 260 may be one hundred fifteen seconds at a slow rate. The timing cycle is so arranged that it will not begin sooner than five seconds in order to avoid the generation of a tremendously great rate which would be occasioned by using a substantial correction in range over a very small time period. As will be pointed out hereinafter, the timing system is recycled every time a range displacement correction is made. Accordingly, the position of the balls 132 of the reciprocal integrator subassembly will always be directly proportional to the time elapsed since the end of the last displacement correction within the limits of travel of the arm 260.

Upon completion of the range displacement correction, the channel 88 becomes de-energized, thus removing the power from the range correction motor 10 and the range recycle solenoid 90. When this happens a spring forming part of the recycle solenoid 90 will move the plate 250 forwardly and rotate it in a clockwise direction. The forward motion of the plate 250 will engage the rotating clutch member 226 with the coacting clutch member 228. At the same time, the rod 244 will be carried around clear of the toes of the recycle cam 210 and the five-second cam 234. The recycle cam 210 will be driven from the timing motor through the gear train hereinbefore described in a clockwise direction, thus causing the member 208 to move to the left, thus tightening spring 214. The spring 214 is stronger than the spring 216 so that its tension will counteract the pull of spring 216 and rotate the lever 202 in a clockwise direction, thus loosening band brake 200 and tightening band brake 196. When this occurs the shaft 192 will be driven in a clockwise direction at the rapid rate of the drive from bevel gear 150. The difference in driving rates is such that the arm 260 will move to the right, as viewed in FIGURE 1 in a space of less than one second. While the upper limit switch 136 is a normally closed switch, the lower limit switch 266, or the "five-second" switch, is normally open. This switch controls a latching arrangement for the rate switch such that the rate switch cannot be actuated until the five-second switch closes to unlatch the latching arrangement. Channels 268 and 270 are interposed in the rate switch unlatching circuit which is controlled by the switch 266. When the lug 262 strikes the arm 272 of the switch 266 it will close it and unlatch the rate switch which must be closed to energize the rate solenoid 138. The setting of the recycle clutch will move the recycle cam 210 slightly to the left upon the shaft 232, pressing it against the ball 240 carried by the five-second cam 234 so that the recycle cam 210 will carry the five-second cam 234 around with it as it is being rotated by the time motor drive through the rotating clutch member 226. Five seconds after the recycle cam begins rotating, the ball 240 will be opposite the re-entrant portion 238 formed in the plate 236. The seating of the ball in the re-entrant portion will release the clutch pressure and that the spring 214 will be relieved of its tension due to the fact that the member 208 will move to the right rotating the recycle cam which is no longer being driven due to the fact that the clutch pressure has been released by the ball 240 dropping into the re-entrant portion 238. Accordingly, five seconds after the recycle solenoid has been de-energized the timing cycle will again start at the correct rate and the balls 132 will again be displaced outwardly as a function of time. Since the ball carriage was stopped at the five-second position, it will continue to measure time from the last correction as five seconds have been measured by the five-second cam. The timing system will remain in the time measuring condition until the lug 262 hits the upper limit switch. When this occurs the band brake 200 will slip until the tracking lever is again displaced to return the system to the range system setup. It will be observed that at the upper limit position, if a rate correction is being made, it will automatically be stopped by the de-energization of the rate solenoid 138. When the rate switch is actuated it will energize not only channel 134, but also channel 280. The energization of channel 280 will energize channel 282, furnishing energy to the recycling disabling solenoid 212. It has been shown that every time the tracking lever is returned to the neutral position, tthe timing system will recycle after a period of five seconds. When the rate switch is closed, however, the recycling disabling solenoid 212 will be energized, moving the armature 284 of this solenoid upwardly and rotating the member 208 about the pin 204 in a clockwise direction. This will lower the right-hand end of the member 208 and disconnect the notch at the end of the member 208 from the lower toe 246 of the recycling cam 210, permitting the spring 216 to rotate the lever 202 in a counterclockwise direction to the position shown in FIGURE 2. With the disabling solenoid 212 energized, the making of a displacement correction will not recycle the timing system and, accordingly, the correction will be based upon the time between the end of the last displacement-only correction and the last rate correction, and the intervening corrections will have no effect on the final result.

When the range is beyond the limits of the computer, channel 98 interrupts the recycling energization channel 94 through a signal delivered through channel 98. Channel 98 also controls a latch upon the rate switch preventing this switch from being closed when the range is beyond the limits of the computer. In a sighting system such as is shown in copending application of Maurits ten Bosch et al., Serial No. 141,798, referred to above, the sighting system is stabilized between predetermined limits. When the stabilization limits are exceeded, channel 286 is energized to actuate the recycling disabling solenoid 212. The switch 266 also latches the rate switch so that it cannot be closed. It is necessary to make a displacement-only correction to cause the timing system to recycle. This will close the five-second switch 266 and unlatch the rate switch. After a displacement-only correction has been made and the range is within the limits of the tracking computer, the solenoids (not shown) controlling the rate switch will unlatch it, permitting it to be operated. The latching for the rate switch, however, is controlled not only by the range limit switch, but also by the azimuth correction system, as will be pointed out hereinafter. In other words, a displacement-only correction must be made in both range and azimuth before the rate switch can be closed. This prevents introducing an erroneous rate by correcting for displacement which may not be due to a rate velocity error in either range or azimuth. Any suitable means for latching the rate switch may be employed. A simple stop member controlled by a solenoid which, when energized, is withdrawn may be employed, as is well known in the art. Since the construction of the latching system forms no part of the instant invention, it has not been shown and described in detail since it is well within the knowledge of those skilled in the art. The rate switch, furthermore, is provided with a latch locking it in the rate-making position once it has been closed. The closing of the rate switch interrupts channel 80 through which the fast displacement solenoid 78 is energized, thus precluding the making of a fast displacement when the rate switch is closed, thus preventing the generation of a false rate.

Referring now to FIGURE 2 in which I have shown the azimuth system, it will be noted that it is similar in construction and operation to the range system. The displacements, however, are made at different rates. Since the sighting system presentation is made at a constant angle independent of range, the azimuth correction may be made at a constant angular rate. When I speak of azimuth I mean a correction across the line of sight to the right or to the left. If the angular measurement is made in mils, it may be spoken of as deflection. The azimuth motor 310, which is similar to the range motor 10, is a constant speed, reversible motor which is driven at a rate of $\omega_\mu$. The motor 310 drives the disk 316 of a disk and roller multiplier. The shaft 322 is driven directly from the motor 310 through a gear train comprising gears 314, 315, 318, 320, 324 and 325. The gear 333, secured to shaft 322 for rotation therewith, drives one side gear 362 of a differential indicated generally by the reference numeral 354. The cross 360 of this differential is secured to a shaft 332. A clutch member 368 is secured to shaft 322 and controls gears 369 and 370. The side gear 352 of the differential 354 comprises two gears 351 and 355. The gear 369 meshes with the side gear 351 and the gear 370 drives side gear component 355 through idler gear 371. The clutch 368 is controlled by an arm 374 which is urged to rotate in a clockwise direction viewed from above by a spring 376, thus clutching the gear 370 to the shaft 322. When the solenoid 378 is energized through channel 380, the arm 374 will be rotated in a counterclockwise direction viewed from above to actuate the clutch 368 so that gear 369 will drive the side gear 352 of the differential 354 through its gear component 351. The gear 369 will rotate the side gear component 351 in the same direction as the gear 333 rotates the side gear 362. Accordingly, the cross 360 will be carried around at a rapid rate. This arrangement is analogous to setting the fast brake band 64 of the differential 28 of the range system shown in FIGURE 1. When the channel 380 is de-energized and the clutch engages gear 370 and releases gear 369, the side gear component 355 of the differential 354 will drive the side gear. Due to the interposition of the idler gear 371, the direction of rotation of the side gear 352 will be opposite to the direction of rotation of the side gear 362 of the differential 354. Accordingly, the shaft 332 will be driven at a slower rate than the rotation under the drive when the fast gear 369 was clutched. The arrangement is such that when the fast gear is clutched the slow gear is unclutched, the clutch 368 being a double clutch arrangement whereby the setting of one releases the other. The shaft 332 drives the shaft 386 through bevel gears 384 and 382. This shaft 386 introduces $\omega_\mu$ to the computer. The fast rate may introduce an angular change in azimuth of fifteen degrees per second, while the slow rate may introduce a change in azimuth of, say, one-quarter of one degree per second. Since the azimuth correction is made at a constant angular rate, the shaft 386 is driven directly from the correction motor 310. It will be observed in the range system that the shaft 86 for the slow correction is driven from the output of the multiplier, that is, the roller 34. This is due to the fact that the correction in range is a function of range and not an angular correction. Accordingly, in both the range and azimuth systems the cross hairs will move relative to the point of aim at substantially the same linear velocity when the range is between the predetermined limits.

For the rate correction, however, linear velocities rather than angular velocities are required. Accordingly, a multiplier is used to drive the rate integrator in which range is introduced as a factor. The roller 334 is driven from the disk 316 through balls 336 which are carried by a member 338. The balls are displaced from the center of the disk 316 through the carrier 338 by means of the screw 340 which is set through shaft 342 to range. Accordingly, the output of the multiplier as represented by the rotation of shaft 350 will represent $R\omega_\mu$. Azimuth rate corrections may not be made beyond a predetermined range. Therefore, the length of screw 340 is limited to this predetermined range. The output of the shaft of the multiplier as represented by the rotation of shaft 350 drives an inverse multiplier or reciprocal integrator comprising the differential indicated generally by the reference numeral 358, the disk 420, the shaft 416, the booster shaft 404, the worm 406, driving the worm wheel 408 for the roller 412. The balls 432 of the inverse multiplier are displaced by a timing system similar to the timing system for the range correction system as a function of time. The azimuth rate solenoid 438 is energized through channel 434 in which a normally closed limit switch 436 is interposed. Whenever the solenoid 438 is not energized the disk 420 is not driven by the roller 412. Whenever the rate solenoid 438 is energized, the output of the disk 420 to shaft 430 which leads to the computer will be the azimuth correction multiplied by range to give linear velocity and divided by the time elapsed since the completion of the previous azimuth correction. The operation of the timing system for the azimuth correction is identical with that in the range system. The position of the parts in FIGURE 2, however, is shown with the azimuth recycle solenoid 390 deenergized so that the recycle clutch 528 is engaged and the azimuth recycle cam 510 is being driven in a clockwise direction. The ball 540 of the five-second azimuth timing system cam 534 has not yet dropped into the notch 538 formed in the plate 536. Accordingly, the recycle cam is holding the member 508 to the left causing the spring 514 to rotate the lever 502 in a clockwise direction, thus loosening the brake band 500 and freeing the side gear 498 of the differential indicated generally by the reference numeral 470. The clockwise rotation of the lever 502 will tighten the brake band 496, thus holding the side gear 494 of the differential indicated generally by the reference numeral 482. In this condition the fast differential 482 which is being driven from the timing motor shaft 162 through the drive comprising gears 450, 484, 486 and side gear 480 at the rapid rate, causes the arm 460 to move downwardly toward the five-second azimuth timing switch 466. The channel 388 is adapted to energize both the correction motor 310 and the recycling solenoid 390. A switch 396 is adapted to interrupt the circuit to the recycling solenoid whenever the line of sight is beyond the training arc of the sighting system. This switch is controlled through channel 398. The recycling disabling solenoid 512 of the azimuth system is energized through channel 582 which extends from FIGURE 2 to FIGURE 1 and connects with channel 586 which is energized when the sighting system moves beyond stabilization limits and to channel 580 which is energized when the rate switch is closed. The channels 570 and 580 are controlled by the five-second switch 466. When the five-second switch is closed a latching solenoid preventing the closing of the rate switch is energized, thus freeing the rate switch. The interruption of switch 436 breaks the circuit through which the azimuth rate solenoid 438 is energized.

It is to be understood, of course, that both channels 88 and 388 may be energized simultaneously by closing the tracking switches. The correction motors will run in the direction determined by the direction in which the double-throw switches are closed to determine the direction of the correction. Since the recycle solenoids 90 and 390 are not phase sensitive, the direction of the energization of current will have no effect on these, but will determine the direction in which the correction motors 10 and 310 run. In operation, let us assume that the stabilization limits of the sighting system have not been exceeded and that the range and azimuth integrators of the tracking computer are operating and that the range is within the limits of the computer operation and that the sighting system is within the sighting arc of the azimuth limits of train and that both timing systems are against their upper stops with the slow displacement brake bands slipping. An operator looking through the sighting system observes that the horizontal cross hair is below the point of aim and the vertical cross hair is to the left of the point of aim. He throws the tracking switch in the proper direction to displace the horizontal cross hair upwardly to the target and the vertical cross hair to the right to the target. As soon as these displacement-only corrections have been made the recycle solenoids 90 for range and 390 for azimuth will become deenergized and the timing systems will recycle. As soon as the five-second switches have been closed the rate switches may be closed. The making of the displacement-only corrections first ensures that any drift of the horizontal or vertical cross hairs from the point of aim is due to a difference between the velocity of the computed rate of change of range and the actual rate of change of range in the one case, and the computed rate of change of azimuth and the actual rate of change of azimuth in the other case. With the rate switch closed, the operator continues to observe the cross wires. If the horizontal cross wire drifts above or below the target, the application of a correction at this time will generate an appropriate rate increment which is fed to the integrator drive disks provided in the tracking computer. Rate corrections may be made until the timing system reaches the upper limit switch 136 in the range correction system. In practice, an operator will maintain the cross hair on the target for a period of time. A series of corrections in steps, however, will still generate a correct over-all rate for the time period involved. Using a comparatively long base of almost two minutes ensures than an accurate rate will be generated. With the rate switch closed the difference between the initial and the final correction, while maintaining the same time base, determines the rate. The longer time base is advantageous, as it enables a more nearly accurate rate to be maintained in a simple, convenient and expeditious manner. Similarly, an azimuth correction may be made with the rate switch closed and a correct azimuth rate will be fed to the integrator disk drives of the tracking computer. Rate corrections may be made in azimuth until the limit switch 436 is opened through the action of the lug 562 carried by the arm 460 of the azimuth timing system. As long as the rate switch is closed, the recycling disabling solenoids 212 and 512 are energized and the timing systems cannot recycle. In order to recycle the timing systems, the rate switch and the tracking switch must be opened and the rate switch will immediately become latched in the open position until the five-second switches have been closed by the recycling of the timing systems. As soon as the recycling disabling solenoids have been de-energized, the clutches 228 and 528 will drive the recycling cams 210 and 510 through their cycles. A fast displacement may be made by closing the tracking switches and the fast displacement switches simultaneously. The fast displacement switches energize channels 80 for the range and 380 for azimuth. These channels cannot be energized, however, when the rate switch is closed. If the rate switch is not closed, the energization of solenoid 78 will permit a rapid displacement of the horizontal cross wire to the point of aim and the energization of solenoid 378 will permit a rapid displacement of the vertical cross wire to the point of aim. Whenever the integrators of the tracking computer are not energized another latching system for preventing the closing of the rate switch is made effective. The energization of the integrator disk drives of the computer removes one of the latches from the rate switch. The computer cannot make use of the increments of rate generated by my correction system unless the integrator disk drives of the tracking computer are operating, as will be understood by those skilled in the art.

It will be seen that I have accomplished the objects of my invention. I have provided a synchronizer for tracking computers in which the horizontal cross wire may be moved rapidly to the target to correct for differences between the actual range and the range generated by the computer. I have provided a synchronizer for tracking computers in which the rate of change of range generated by the computer may be quickly, accurately and simply corrected to bring the computed velocity of range change into agreement with the actual velocity of range change. I have provided a synchronizer for tracking computers in which the vertical cross wire may be quickly shifted to the target by making a correction in azimuth, and in which computed velocity of azimuth change may be brought into agreement with the actual velocity of azimuth change, in a simple, convenient and expeditious manner. I have provided a synchronizer for tracking computers which is sure and simple in operation, though simple in construction and in which both azimuth and range corrections for displacement only may be made at a rapid rate if desired. In my synchronizer for tracking computers a rate correction is generated and made automatically both in range and in azimuth by simply displacing the sighting system from a point of error to a point of aim by means of a simple tracking switching system.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is therefore to be understood that my invention is not to be limited to the specific details shown and described.

Having thus described my invention, what I claim is:

1. A synchronizer for tracking computers, including in combination a computer in which the coordinates of a point of aim from a moving craft are continuously derived to control a sighting system for maintaining a line of sight from the craft to the point of aim, in which one of said coordinates is along the line of sight and the other of said coordinates is transverse to the line of sight, a motor, a transmission from said motor to the computer input controlling one of said coordinates, said transmission comprising a high speed gear train and a low speed gear train, electrical means for selectively rendering one of said gear trains operative, a signal channel for controlling said means, electrical means for selectively initiating the operation of the motor in a predetermined direction, a signal channel for controlling said last means, manually operable means for selectively energizing said channels and means driven by said gear trains for driving said computer input.

2. A synchronizer as in claim 1 in which the coordinate along the line of sight is range, and in which said transmission includes a multiplier having a pair of input means and an output means, means for connecting the output of said motor to one of said input means, means for connecting the range output of said computer to the other of said input means, and means responsive to the output of said multiplier for driving said low speed gear train.

3. A synchronizer as in claim 1 in which the coordinate along the line of sight is range and in which said transmission includes a multiplier having a pair of input means and an output means, means for connecting the output of said motor to one of said input means, means for connecting the range output of said computer to the other of said input means, means responsive to the output of said multiplier for driving said low speed gear train, a timing means, an inverse multiplier having a pair of input means and an output means, means for connecting the output of said first multiplier to one of the input means of the inverse multiplier, means for connecting the timing means to the other input of the inverse multiplier, and means for connecting the output means of the inverse multiplier to said computer.

4. A synchronizer as in claim 1 in which the coordinate along the line of sight is range and in which said transmission includes a multiplier having a pair of input means and an output means, means for connecting the output of said motor to one of said input means, means for connecting the range output of said computer to the other of said input means, means responsive to the output of said multiplier for driving said low speed gear train, a timing means, an inverse multiplier having a pair of input means and an output means, means for connecting the output of said first multiplier to one of the input means of the inverse multiplier, means for connecting the timing means to the other input of the inverse multiplier, means for connecting the output means of the inverse multiplier to said computer, and means for controlling the output means of the inverse multiplier.

5. A synchronizer as in claim 1 in which the coordinate along the line of sight is range and in which said transmission includes a multiplier having a pair of input means and an output means, means for connecting the output of said motor to one of said input means, means for connecting the range output of said computer to the other of said input means, means responsive to the output of said multiplier for driving said low speed gear train, a timing means, an inverse multiplier having a pair of input means and an output means, means for connecting the output of said first multiplier to one of the input means of the inverse multiplier, means for connecting the timing means to the other input of the inverse multiplier, means for connecting the output means of the inverse multiplier to said computer, means for controlling the output means of the inverse multiplier, said output controlling means comprising an energizable means and manually operable means for energizing the energizable means.

6. A synchronizer as in claim 1 in which the coordinate along the line of sight is range and in which said transmission includes a multiplier having a pair of input means and an output means, means for connecting the output of said motor to one of said input means, means for connecting the range output of said computer to the other of said input means, means responsive to the output of said multiplier for driving said low speed gear train, a timing means, an inverse multiplier having a pair of input means and an output means, means for connecting the output of said first multiplier to one of the input means of the inverse multiplier, means for connecting the timing means to the other input of the inverse multiplier, means for connecting the output means of the inverse multiplier to said computer, means for controlling the output means of the inverse multiplier, said output controlling means comprising an energizable means, manually operable means for energizing the energizable means, and means responsive to a predetermined action of the timing means for de-energizing the energizable means.

7. A synchronizer as in claim 1 in which the coordinate along the line of sight is range and in which said transmission includes a multiplier having a pair of input means and an output means, means for connecting the output of said motor to one of said input means, means for connecting the range output of said computer to the other of said input means, means responsive to the output of said multiplier for driving said low speed gear train, a timing means, an inverse multiplier having a pair of input means and an output means, means for connecting the output of said first multiplier to one of the input means of the inverse multiplier, means for connecting the timing means to the other input of the inverse multiplier, means for connecting the output means of the inverse multiplier to said computer, said timing means including a timing motor, driven means, timing transmission means having a high speed gear train and a low speed gear train between the timing motor and the driven means, the low speed gear train being constructed to drive the driven means in one direction and the high speed gear train being constructed to drive the driven means in the opposite direction, and cycling means for selectively controlling said gear trains.

8. A synchronizer as in claim 1 in which the coordinate along the line of sight is range and in which said transmission includes a multiplier having a pair of input means and an output means, means for connecting the output of said motor to one of said input means, means for connecting the range output of said computer to the other of said input means, means responsive to the output of said multiplier for driving said low speed gear train, a timing means, an inverse multiplier having a pair of input means and an output means, means for connecting the output of said first multiplier to one of the input means of the inverse multiplier, means for connecting the timing means to the other input of the inverse multiplier, means for connecting the output means of the inverse multiplier to said computer, said timing means including a timing motor, driven means, timing transmission means having a high speed gear train and a low speed gear train between the timing motor and the driven means, the low speed gear train being constructed to drive the driven means in one direction and the high speed gear train being constructed to drive the driven means in the opposite direction, cycling means for selectively controlling said gear trains, said cycling means including a recycle solenoid, means for energizing the solenoid concomitantly with the energization of said first motor, and means responsive to the energization of the solenoid for engaging the high speed timing gear train.

9. A synchronizer as in claim 1 in which the coordinate along the line of sight is range and in which said transmission includes a multiplier having a pair of input means and an output means, means for connecting the output of said motor to one of said input means, means for connecting the range output of said computer to the other of said input means, means responsive to the output of said multiplier for driving said low speed gear train, a timing means, an inverse multiplier having a pair of input means and an output means, means for connecting the output of said first multiplier to one of the input means of the inverse multiplier, means for connecting the timing means to the other input of the inverse multiplier, means for connecting the output means of the inverse multiplier to said computer, said timing means including a timing motor, driven means, timing transmission means having a high speed gear train and a low speed gear train between the timing motor and the driven means, the low speed gear train being constructed to drive the driven means in one direction and the high speed gear train being constructed to drive the driven means in the opposite direction, cycling means for selectively controlling said gear trains, said cycling means including a recycle solenoid, means for energizing the solenoid concomitantly with the energization of said first motor, means responsive to the energization of the solenoid for engaging the high speed timing gear train, and means responsive to the timing motor for shifting the timing transmission from the high speed gear train to the low speed gear train after a predetermined time interval.

10. A synchronizer as in claim 1 in which the coordinate along the line of sight is range and in which said transmission includes a multiplier having a pair of input means and an output means, means for connecting the output of said motor to one of said input means, means for connecting the range output of said computer to the other of said input means, means responsive to the output of said multiplier for driving said low speed gear train, a timing means, an inverse multiplier having a pair of input means and an output means, means for connecting the output of said first multiplier to one of the input means of the inverse multiplier, means for connecting the timing means to the other input of the inverse multiplier, means for connecting the output means of the inverse multiplier to said computer, said timing means including a timing motor, driven means, timing transmission means having a high speed gear train and a low speed gear train between the timing motor and the driven means, the low speed gear train being constructed to drive the driven means in one direction and the high speed gear train being constructed to drive the driven means in the opposite direction, cycling means for selectively controlling said gear trains, said cycling means including a recycle solenoid, means for energizing the solenoid concomitantly with the energization of said first motor, means responsive to the energization of the solenoid for engaging the high speed timing gear train, energizable means for controlling the output means of said inverse multiplier, manually operable means for energizing the energizable means, a recycle disabling means, means for rendering disabling means operative concomitantly with the energization of said energizable means, and means responsive to the operation of the disabling means for preventing the engagement of the high speed timing gear train.

11. A synchronizer as in claim 1 in which the coordinate along the line of sight is range and in which said transmission includes a multiplier having a pair of input means and an output means, means for connecting the output of said motor to one of said input means, means for connecting the range output of said computer to the other of said input means, means responsive to the output of said multiplier for driving said low speed gear train, a timing means, an inverse multiplier having a pair of input means and an output means, means for connecting the output of said first multiplier to one of the input means of the inverse multiplier, means for connecting the timing means to the other input of the inverse multiplier, means for connecting the output means of the inverse multiplier to said computer, said timing means including a timing motor, driven means, timing transmission means having a high speed gear train and a low speed gear train between the timing motor and the driven means, the low speed gear train being constructed to drive the driven means in one direction and the high speed gear train being constructed to drive the driven means in the opposite direction, cycling means for selectively controlling said gear trains, energizable means for controlling the output means of said inverse multiplier, manually operable means for energizing the energizable means, and means responsive to a predetermined travel of the timing driven means in one direction for de-energizing the energizable means.

12. A synchronizer as in claim 1 in which the coordinate transverse to the line of sight is azimuth, a multiplier having a pair of input means and an output means, means for connecting the output of said motor to one of said input means, means for connecting the range output of said computer to the other of said input means, a timing means, an inverse multiplier having a pair of input means and an output means, means for connecting the output of said first multiplier to one of the input means of the inverse multiplier, means for connecting the timing means to the other input of the inverse multiplier and means for connecting the output means of the inverse multiplier to said computer.

13. A synchronizer as in claim 1 in which the coordinate transverse to the line of sight is azimuth, a multiplier having a pair of input means and an output means, means for connecting the output of said motor to one of said input means, means for connecting the range output of said computer to the other of said input means, a timing means, an inverse mutliplier having a pair of input means and an output means, means for connecting the output of said first multiplier to one of the input means of the inverse multiplier, means for connecting the timing means to the other input of the inverse multiplier, means for connecting the output means of the inverse multiplier to said computer, energizable means for controlling the output means of the inverse multiplier, and manually operable means for energizing the energizable means.

14. A synchronizer as in claim 1 in which the coordinate transverse to the line of sight is azimuth, a multiplier having a pair of input means and an output means, means for connecting the output of said motor to one of said input means, means for connecting the range output of said computer to the other of said input means, a timing means, an inverse mutliplier having a pair of input means and an output means, means for connecting the output of said first multiplier to one of the input means of the inverse multiplier, means for connecting the timing means to the other input of the inverse multiplier, means for connecting the output means of the inverse multiplier to said computer, energizable means for controlling the output means of the inverse multiplier, manually operable means for energizing the energizable means, and means responsive to a predetermined action of the timing means for de-energizing the energizable means.

15. A synchronizer as in claim 1 in which the coordinate transverse to the line of sight is azimuth, a multiplier having a pair of input means and an output means, means for connecting the output of said motor to one of said input means, means for connecting the range output of said computer to the other of said input means, a timing means, an inverse multiplier having a pair of input means and an output means, means for connecting the output of said first multiplier to one of the input means of the inverse multiplier, means for connecting the timing means to the other input of the inverse multiplier, means for connecting the output means of the inverse multiplier to said computer, said timing means including a timing motor, driven means, timing transmission means having a high speed gear train and a low speed gear train between the timing motor and the driven means, the low speed gear train being constructed to drive the driven means in one direction and the high speed gear train being constructed to drive the driven means in the opposite direction, and cycling means for selectively controlling said gear trains.

16. A synchronizer as in claim 1 in which the coordinate transverse to the line of sight is azimuth, a multiplier having a pair of input means and an output means, means for connecting the output of said motor to one of said input means, means for connecting the range output of said computer to the other of said input means, a timing means, an inverse multiplier having a pair of input means and an output means, means for connecting the output of said first multiplier to one of the input means of the inverse multiplier, means for connecting the timing means to the other input of the inverse multiplier, means for connecting the output means of the inverse multiplier to said computer, said timing means including a timing motor, driven means, timing transmission means having a high speed gear train and a low speed gear train between the timing motor and the driven means, the low speed gear train being constructed to drive the driven means in one direction and the high speed gear train being constructed to drive the driven means in the opposite direction, cycling means for selectively controlling said gear trains, said cycling means comprising a recycle solenoid, means for energizing the solenoid concomitantly with the energization of said first motor, and means responsive to the energization of the solenoid for engaging the high speed timing gear train.

17. A synchronizer as in claim 1 in which the coordinate transverse to the line of sight is azimuth, a multiplier having a pair of input means and an output means, means for connecting the output of said motor to one of said input means, means for connecting the range output of said computer to the other of said input means, a timing means, an inverse multiplier having a pair of input means and an output means, means for connecting the output of said first multiplier to one of the input means of the inverse multiplier, means for connecting the timing means to the other input of the inverse multiplier, means for connecting the output means of the inverse multiplier to said computer, said timing means including a timing motor, driven means, timing transmission means having a high speed gear train and a low speed gear train between the timing motor and the driven means, the low speed gear train being constructed to drive the driven means in one direction and the high speed gear train being constructed to drive the driven means in the opposite direction, cycling means for selectively controlling said gear trains, said cycling means comprising a recycle solenoid, means for energizing the solenoid concomitantly with the energization of said first motor, means responsive to the energization of the solenoid for engaging the high speed timing gear train, means responsive to the timing motor for shifting the timing transmission from the high speed gear train to the low speed gear train after a predetermined time interval.

18. A synchronizer as in claim 1 in which the coordinate transverse to the line of sight is azimuth, a multiplier having a pair of input means and an output means, means for connecting the output of said motor to one of said input means, means for connecting the range output of said computer to the other of said input means, a timing means, an inverse multiplier having a pair of input means and an output means, means for connecting the output of said first multiplier to one of the input means of the inverse multiplier, means for connecting the timing means to the other input of the inverse multiplier, means for connecting the output means of the inverse multiplier to said computer, energizable means for controlling the output means of the inverse multiplier, manually operable means for energizing the energizable means, said timing means including a timing motor, driven means, timing transmission means having a high speed gear train and a low speed gear train between the timing motor and the driven means, the low speed gear train being constructed to drive the driven means in one direction and the high speed gear train being constructed to drive the driven means in the opposite direction, cycling means for selectively controlling said gear trains, a recycling disabling means, means for rendering said disabling means operative concomitantly with the energization of said energizable means, and means responsive to the operation of said disabling means for preventing the engagement of the high speed timing gear train.

19. A synchronizer as in claim 1 in which the coordinate transverse to the line of sight is azimuth, a multiplier having a pair of input means and an output means, means for connecting the output of said motor to one of said input means, means for connecting the range output of said computer to the other of said input means, a timing means, an inverse multiplier having a pair of input means and an output means, means for connecting the output of said first multiplier to one of the input means of the inverse multiplier, means for connecting the timing means to the other input of the inverse multiplier, means for connecting the output means of the inverse multiplier to said computer, energizable means for controlling the output means of the inverse multiplier, manually operable means for energizing the energizable means, said timing means including a timing motor, driven means, timing transmission means having a high speed gear train and a low speed gear train between the timing motor and the driven means, the low speed gear train being constructed to drive the driven means in one direction and the high speed gear train being constructed to drive the driven means in the opposite direction, cycling means for selectively controlling said gear trains, a recycling disabling means, means for rendering said disabling means operative concomitantly with the energization of said energizable means, means responsive to the operation of said disabling means for preventing the engagement of the high speed timing gear train, and means responsive to a predetermined travel of the driven means in one direction for de-energizing the energizable means.

20. A synchronizer as in claim 1 in which the coordinate transverse to the line of sight is azimuth, a multiplier having a pair of input means and an output means, means for connecting the output of said motor to one of said input means, means for connecting the range output of said computer to the other of said input means, a timing means, an inverse multiplier having a pair of input means and an output means, means for connecting the output of said first multiplier to one of the input means of the inverse multiplier, means for connecting the timing means to the other input of the inverse multiplier, means for connecting the output means of the inverse multiplier to said computer, energizable means for controlling the output means of the inverse multiplier, manually operable means for energizing the energizable means, said timing means including a timing motor, driven means, timing transmission means having a high speed gear train and a low speed gear train between the timing motor and the driven means, the low speed gear train being constructed to drive the driven means in one direction and the high speed gear train being constructed to drive the driven means in the opposite direction, cycling means for selectively controlling said gear trains, a recycling disabling means, means for rendering said disabling means operative concomitantly with the energization of said energizable means, means responsive to the operation of said disabling means for preventing the engagement of the high speed timing gear train, said manually controlled means for selectively rendering one of said first named gear trains operative, comprising means for concomitantly rendering the low speed gear train operative concomitantly with the energization of said energizable means.

References Cited in the file of this patent

UNITED STATES PATENTS

| | | |
|---|---|---|
| 1,132,478 | Johnson | Mar. 16, 1915 |
| 2,384,776 | Trofimor | Sept. 11, 1945 |
| 2,426,597 | Chafee | Sept. 2, 1947 |
| 2,436,582 | Lear | Feb. 24, 1948 |
| 2,442,389 | Weiss | June 1, 1948 |
| 2,460,863 | Weiss | Feb. 8, 1949 |
| 2,487,211 | Bell | Nov. 8, 1949 |
| 2,497,842 | Armitage | Feb. 14, 1950 |